J. Absterdam,
Manf. Steel.
No. 97,582.  Patented Dec. 7, 1869.
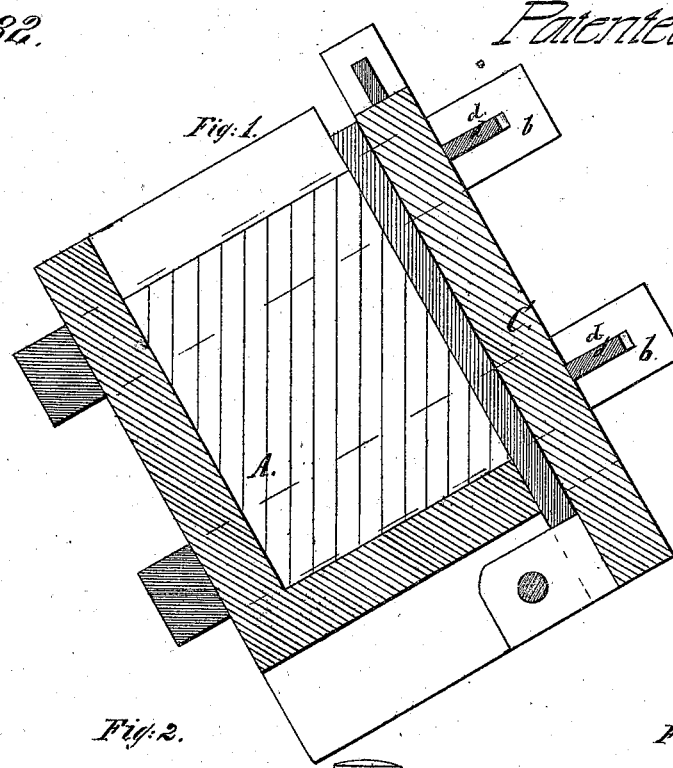
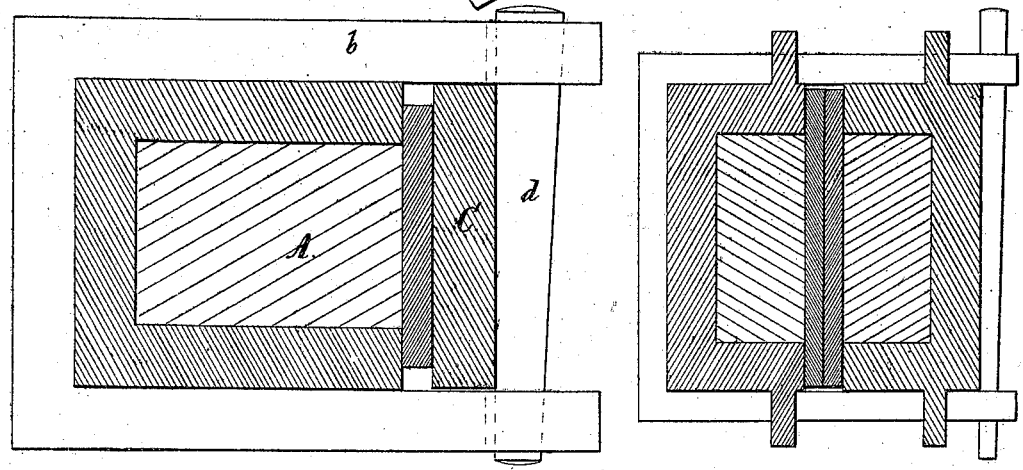
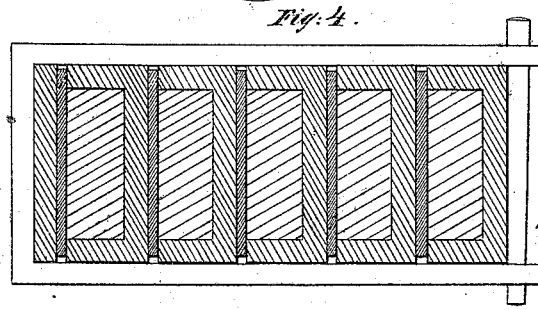
Witnesses.  Inventor.

UNITED STATES PATENT OFFICE.

JOHN ABSTERDAM, OF NEW YORK, N. Y.

IMPROVEMENT IN THE MANUFACTURE OF STEEL.

Specification forming part of Letters Patent No. 97,582, dated December 7, 1869.

*To all whom it may concern:*

Be it known that I, JOHN ABSTERDAM, of the city, county, and State of New York, have invented a new and useful Improvement in the Manufacture of Steel; and I do hereby declare that the following is a full, clear, and exact description thereof, which will enable those skilled in the art to make and use the same, reference being had to the accompanying drawing, forming part of this specification, in which drawing—

Figure 1 represents a longitudinal section of this invention. Fig. 2 is a transverse section of the same. Figs. 3 and 4 are similar sections of modifications of the same.

Similar letters indicate corresponding parts.

The object of this invention is to produce a compound of steel of such a nature that it is capable of being welded, while it preserves all the good qualities of cast-steel.

It is well known to all men well conversant with metallurgy that cast-steel and Bessemer steel do not possess the welding qualities of wrought-iron, and can only be welded with great difficulty and by well-practiced hands.

It is also well known that cemented steel possesses the properties of welding nearly as good as wrought-iron, although it may chemically contain the same amount of carbon as cast-steel, which facts are well known to chemists; but the carbon in blistered steel is not evenly or regularly distributed throughout the whole metal, and it requires to be repeatedly forged and welded for its distribution throughout the metal, which process renders that kind of steel very expensive, especially where the price of labor is high. The cast-steel and Bessemer steel, on the contrary, have their carbon well distributed throughout the whole mass, on account of having been reduced to a fluid state before forging; but this steel, not possessing good welding properties, cannot be used with advantage for many purposes, where a good and reliable welding to iron is required. So, in order to impart the property of welding to cast-steel and to Bessemer steel, I fuse with the same a thin surface of steel of cementation by pouring the molten cast-steel or Bessemer steel in a mold against one or more surfaces of a thin plate of blistered steel, which operation I accomplish as follows: I first procure a mold with the usual closing edges or faces planed smooth and true, so as to form a good joint when the closing faces are brought together. I then convert bars or plates of wrought-iron into steel by cementing them in an ordinary cementing-furnace with some carbonaceous matter, in any known manner, such as now practiced in making blistered steel, only taking good care not to leave the bars too long in the cement, so as not to get them too highly carbonized, as they are not required for melting purposes. I next melt the cast-steel or Bessemer steel in any of the known ways, either in pots, furnaces, or converters, and when the molten steel is near the melting-point I introduce the blistered-steel plates into a verberatory or other suitable furnace, and bring them to a bright-yellow heat by the time that the cast or Bessemer steel is ready to be poured. I immediately introduce two heated plates or bars, face to face, in and between the closing-faces of the mold, as seen in Fig. 3, and set the mold upright in an inclined position, as seen in Fig. 1, and while the blistered steel so inclosed yet retains its heat I immediately pour in the molten cast or Bessemer steel in each side or compartment of the mold, thereby inclosing the two plates of blistered steel between two masses of molten steel, which soon brings the two inclosed plates to the same temperature of the molten mass, and thereby the two metals are united by welding or semi-fusion of one metal into the other; but in order to facilitate the process of casting, I construct my mold as shown in Figs. 1 and 2, which has a chamber, A, and a closing-cover, C, working on hinges, and provided with straps and keys *b* and *d*. In casting with this mold I place the red-hot slab of blistered steel flat down on the interior of the cover C, and I immediately close the same, so as to clasp the slab between its closing-faces, and I then key the mold, placing it ready for use, as seen in Fig. 1, when I immediately pour in the molten steel. This mold possesses some advantages for quick work.

My invention may also be carried out by placing ordinary molds face of one against the back of the other, and inclosing and clasping the plates of blistered steel in and between their closing-faces, as shown in Fig. 4; and as it is not required that the cemented steel should be very highly carbonized, I can substitute for the same case-hardened wrought-iron bars, since it is in the surface of the bar where the carbon is most required, so as to facilitate the welding or fusing together of the two metals at a lower heat than it could be accomplished with an iron plate free from or containing a smaller amount of carbon.

I would here mention that if a wrought-iron bar should be desired to be embodied with cast-steel or Bessemer steel, I heat the same to a white welding-heat in some furnace, as before stated for heating the bars of blistered steel, and, placing the heated bar or bars in the mold, clasping it between the closing-edges of the same, I pour in the molten steel, as before stated.

After the ingots are cast in the above manner, I hammer or roll them into bars or plates as a merchantable article ready for use. These bars or plates are mostly intended for welding to iron, such as being placed on an iron pile and rolled into railroad-rails, the iron or blistered-steel surface of the bar being placed against the pile, so as to insure its welding to the same, and the cast or Bessemer steel forming the head of the rail. These bars or plates are also intended for making armor-plates by welding the same to iron, in placing the iron on the converted steel surface of the bar against the iron plate to be welded, or to be welded steel to steel in the manufacture of armor-plates where only steel is required, and for various other purposes where cast-steel or Bessemer steel is required to be used and welded to itself or to other metals.

The advantages of my invention are as follows, viz:

First, by placing in a mold a bar of steel of cementation and fusing to it an ingot of cast-steel in the process of casting the same. The molten steel coming in contact with the blistered bar, welding takes place by the molten metal fusing the surface of the cemented bar, the two metals uniting together, forming one solid mass. When case-hardened wrought-iron bars are used instead of blistered steel, the carbon imparted to the iron plate renders its surface fusible, which also permits of fusing the two surfaces together into one solid mass, thereby producing a better union of the two metals than could be produced by pouring the steel to iron without carbon.

Second, as the metal known as "Bessemer steel" can be produced very cheap, compared to other homogeneous steel, but is very uncertain of welding, it is of the utmost importance to impart to that metal the property of welding, which I very readily accomplish by fusing to it a surface of steel of cementation or case-hardened iron in the manner above mentioned.

Third, by clamping the cemented steel or iron bar in the mold between its closing-edges, I am enabled to pour the molten metal only on the side which is required, by preventing the fluid metal from running around the bar, as otherwise would be the case if the edges of the iron or steel bar were not firmly held between the closing-faces of the mold.

By clamping two slabs of cemented steel or wrought-iron face to face in the mold between its closing-edges and pouring molten steel in both compartments of the mold, as seen at Fig. 3, I bring the clamped slabs to such an intense heat as to cause a fusing of the same to the fluid steel without previously heating them to a welding-heat. And I will further state that, if the iron or cemented steel slabs should be required sufficiently thin, the same can be used and inserted in the mold, without previously heating them, by simply subjecting them to the same cleaning process now practiced in cleansing sheet-iron in the manufacture of tinned plate.

What I claim as new, and desire to secure by Letters Patent, is—

1. A steel compound made of cast or Bessemer steel and cemented steel or steel of cementation, substantially in the manner and for the purposes described.

2. A compound made of cast or Bessemer steel and case-hardened wrought-iron, substantially in the manner herein set forth.

3. The within-described process of producing a compound of steel and iron, or of cast or Bessemer steel and blistered steel, by clamping a slab of iron or blistered steel between the closing-faces of the mold and pouring the molten cast or Bessemer steel against it, substantially as set forth.

4. Clamping two slabs of iron or cemented steel face to face between the closing-edges of the mold, so as to produce two castings of the same mold, substantially as described.

This specification signed by me this 15th day of November, 1869.

JOHN ABSTERDAM.

Witnesses:
 W. HAUFF,
 E. F. KASTENHUBER.